United States Patent
Fanzutti

(10) Patent No.: US 6,380,521 B1
(45) Date of Patent: Apr. 30, 2002

(54) KITCHEN APPLIANCE WITH IMPROVED HEATING ELEMENT CONTROL

(75) Inventor: Robert F. Fanzutti, Naugatuck, CT (US)

(73) Assignee: HP Intellectual Corp., Wilmington, DE (US)

( * ) Notice: Subject to any disclaimer, the term of this patent is extended or adjusted under 35 U.S.C. 154(b) by 0 days.

(21) Appl. No.: 09/695,655

(22) Filed: Oct. 30, 2000

(51) Int. Cl.[7] ............................. H05B 3/02; H05B 1/02
(52) U.S. Cl. ..................... 219/481; 219/482; 219/497
(58) Field of Search ........................ 219/481, 482, 219/483, 489, 490, 494, 497, 507, 509, 510; 99/280, 281, 288

(56) References Cited

U.S. PATENT DOCUMENTS

| | | | |
|---|---|---|---|
| 4,206,341 A | | 6/1980 | Leuschner et al. .......... 219/283 |
| 4,330,702 A | | 5/1982 | Cheng ........................ 219/492 |
| 4,356,381 A | | 10/1982 | Flaherty, Jr. et al. ....... 219/283 |
| 4,393,300 A | * | 7/1983 | Proctor ...................... 219/497 |
| 4,493,980 A | * | 1/1985 | Payne et al. ................ 219/497 |
| 4,566,802 A | | 1/1986 | Koehler .......................... 368/9 |
| 4,758,709 A | | 7/1988 | Schiebelhuth et al. ...... 219/283 |
| 4,838,152 A | * | 6/1989 | Kubicko et al. .............. 99/280 |
| 4,853,519 A | | 8/1989 | Tanaka et al. ............... 219/497 |
| 4,857,758 A | | 8/1989 | Rigazio et al. ............. 307/140 |
| 4,886,955 A | | 12/1989 | Kimura ....................... 219/494 |
| 5,193,139 A | | 3/1993 | Schiettecatte ............... 392/480 |
| 5,241,898 A | * | 9/1993 | Newman ...................... 99/280 |
| 5,437,002 A | * | 7/1995 | Bennett ...................... 219/497 |
| 5,455,887 A | | 10/1995 | Dam .......................... 392/497 |
| 5,539,856 A | | 7/1996 | Andrew et al. ............. 392/467 |

* cited by examiner

Primary Examiner—Sang Paik
(74) Attorney, Agent, or Firm—Barry E. Deutsch

(57) ABSTRACT

A kitchen appliance having a heating element and a control for controlling supply of electricity to the heating element. The control comprises a temperature sensor comprising a thermistor or thermocouple; an electronic controller electrically connected to the temperature sensor; and a user actuatable input connected to the electronic controller for selecting upper and lower temperatures for cycling OFF and ON supply of electricity to the heating element. For all of the user selectable upper temperatures, the electronic controller is adapted to turn OFF supply of electricity to the heating element when an output from the temperature sensor indicates a sensed temperature which is equal to or above the selected upper temperature plus a first predetermined temperature value.

18 Claims, 5 Drawing Sheets

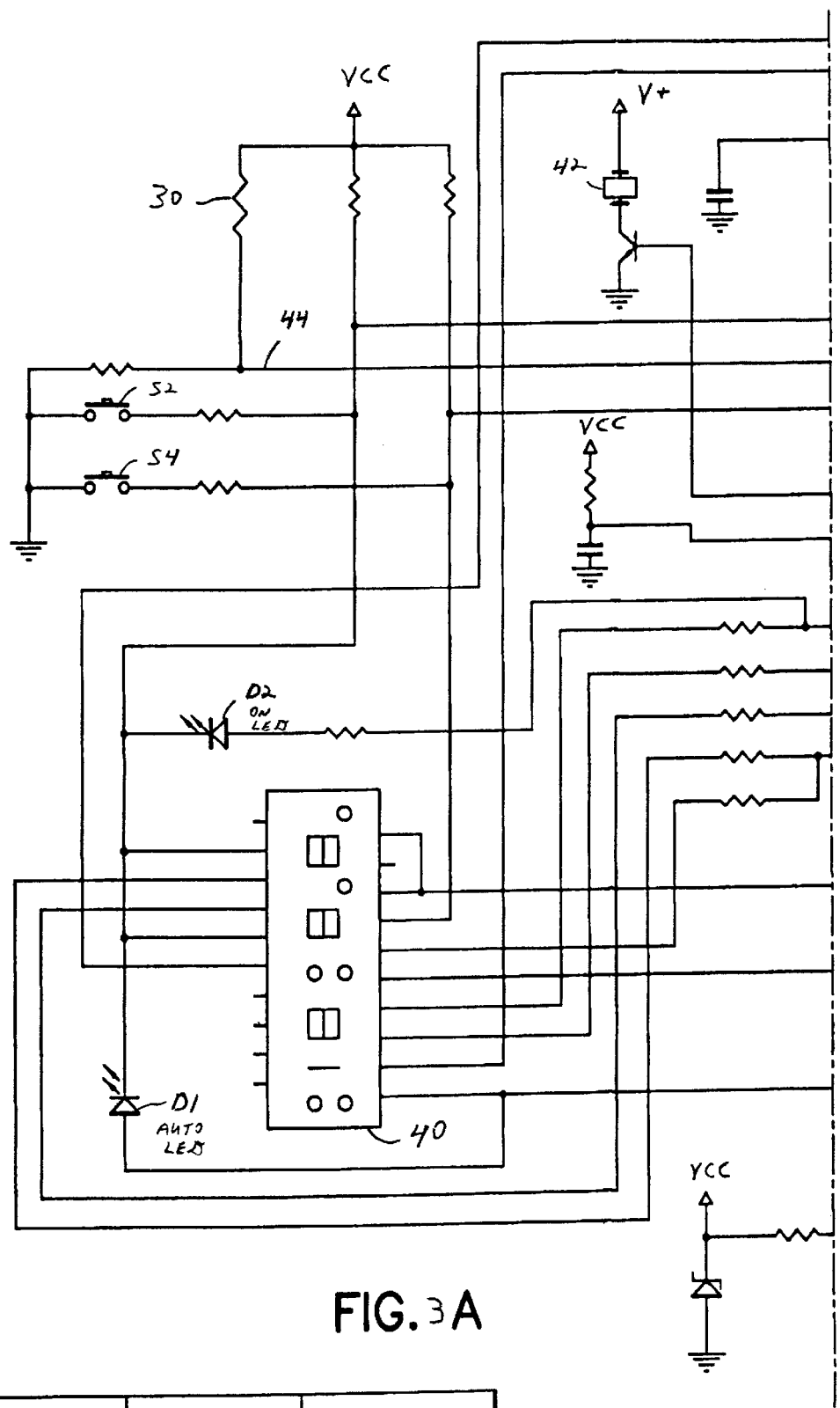

Fig. 4

| Output From Sensor (Volts) | Indicative of: | Controller Operation: |
|---|---|---|
| 0 | Open electrical path at path through sensor | Discontinue supply of electricity to heating element |
| VCC | Short in electrical path around sensor | Discontinue supply of electricity to heating element |

Fig. 5

| User Selected Setting | Programmed ON-OFF Temperatures For User Selected Setting ($X_N°$ : $Y_N°$) (degrees) | Expected Lower Voltage And Upper Voltage Outputs From Sensor Based Upon ON-OFF Temperatures ($V_{LN}$ : $V_{UN}$) (Volts) | | Temperature of Out of Range Temperature Condition (Sum of $Y_N + Z_N°$) (degrees) | Programmed Expected Voltage For Out of Range Temperature Condition (For $Y_N° + Z_N°$; Sum of $V_{UN} + V_{ZN}$) (Volts) |
|---|---|---|---|---|---|
| H1 | $X_1°$ : $Y_1°$ | $V_{L1}$ | $V_{U1}$ | $Y_1° + Z_1°$ | $V_{U1} + V_{Z1}$ |
| H2 | $X_2°$ : $Y_2°$ | $V_{L2}$ | $V_{U2}$ | $Y_2° + Z_2°$ | $V_{U2} + V_{Z2}$ |
| H3 | $X_3°$ : $Y_3°$ | $V_{L3}$ | $V_{U3}$ | $Y_3° + Z_3°$ | $V_{U3} + V_{Z3}$ |
| H4 | $X_4°$ : $Y_4°$ | $V_{L4}$ | $V_{U4}$ | $Y_4° + Z_4°$ | $V_{U3} + V_{Z4}$ |
| H5 | $X_5°$ : $Y_5°$ | $V_{L5}$ | $V_{U5}$ | $Y_5° + Z_5°$ | $V_{U5} + V_{Z5}$ |
| H6 | $X_6°$ : $Y_6°$ | $V_{L6}$ | $V_{U6}$ | $Y_6° + Z_6°$ | $V_{U6} + V_{Z6}$ |
| H7 | $X_7°$ : $Y_7°$ | $V_{L7}$ | $V_{U7}$ | $Y_7° + Z_7°$ | $V_{U7} + V_{Z7}$ |

KITCHEN APPLIANCE WITH IMPROVED HEATING ELEMENT CONTROL

BACKGROUND OF THE INVENTION

1. Field of the Invention

The present invention relates to kitchen appliances and, more particularly, to control of a heating element.

2. Prior Art

Electric coffee makers can have a hot plate or heating plate to keep a coffee pot warm. Some coffee makers have an adjustable warming plate. Thermal cut off (TCO) fuses are used to prevent the heating plates from overheating. Some coffee makers have electronic circuitry and a timer for programmed brewing. A potential problem with some coffee makers is that the TCO fuses can sometimes fail in a closed or shorted position. Even when two TCOs are used in series, if they come from the same manufacturing batch of TCO fuses, they may have the same failure problems. There is a need to provide a more dependable heating element control which can overcome the potential problem of TCOs in a coffee maker failing.

SUMMARY OF THE INVENTION

In accordance with one embodiment of the present invention, a kitchen appliance is provided having a heating element and a control for controlling supply of electricity to the heating element. The control comprises a temperature sensor comprising a thermistor or thermocouple; an electronic controller electrically connected to the temperature sensor; and a user actuatable input connected to the electronic controller for selecting upper and lower temperatures for cycling OFF and ON supply of electricity to the heating element. For all of the user selectable upper temperatures, the electronic controller is adapted to turn OFF supply of electricity to the heating element when an output from the temperature sensor indicates a sensed temperature which is equal to or above the selected upper temperature plus a first predetermined temperature value.

In accordance with another embodiment of the present invention, a kitchen appliance is provided having a heating element and a control for controlling supply of electricity to the heating element. The control comprises a temperature sensor adapted to output a sensed temperature signal; an electronic controller connected to the temperature sensor; and a user actuatable input connected to the electronic controller for selecting a temperature range of the heating element. The electronic controller is adapted to interrupt supply of electricity to the heating element upon the sensed temperature signal from the temperature sensor being either about 0 volts or about an input voltage into the temperature sensor.

In accordance with another embodiment of the present invention, an electric coffee maker is provided having a water heater, a heating plate for a coffee pot, the heating plate having an electric calrod, and a heating plate control. The heating plate control comprises a first thermal cut off fuse adapted to open at a first temperature; a second thermal cut off fuse adapted to open at a second different temperature, the first and second fuses being connected in series between the calrod and a supply of electricity; an electronic controller adapted to open and close a path between the supply of electricity and the first fuse; and a temperature sensor connected to the electronic controller. The electronic controller is adapted to open and close the path between the supply of electricity and the first fuse based upon an output from the temperature sensor.

BRIEF DESCRIPTION OF THE DRAWINGS

The foregoing aspects and other features of the present invention are explained in the following description, taken in connection with the accompanying drawings, wherein:

FIGS. 3A–3C show a circuit diagram of circuitry used in the coffee maker shown in FIG. 1;

FIG. 4 is a chart of actions for two extreme outputs of the temperature sensor; and FIG. 5 is a chart of temperatures and temperature sensor output for different user selected hot plate settings for the coffee maker shown in FIG. 1;

DETAILED DESCRIPTION OF THE PREFERRED EMBODIMENT

Figure 1:
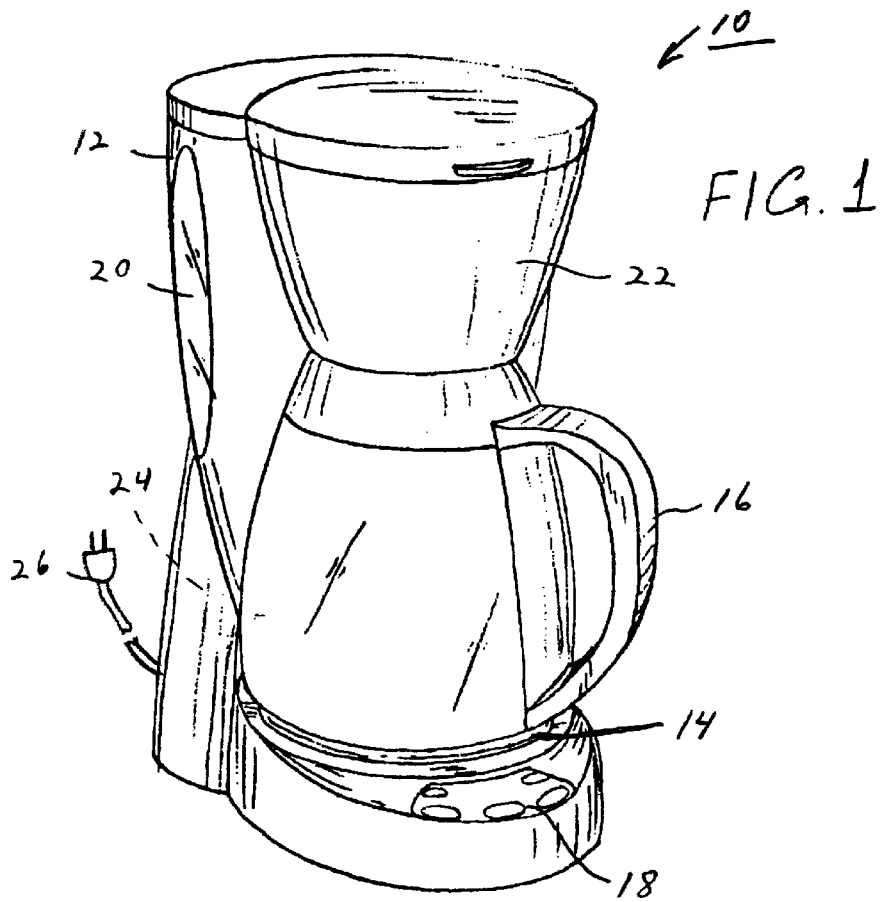
FIG. 1 is a perspective view of an electric coffee maker incorporating features of the present invention.

Referring to FIG. 1, there is shown a perspective view of an electric coffee maker 10 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used. Features of the present invention could also be used in other types of electric devices or kitchen appliances, such as a toaster, an oven, a slower cooker, an electric frying pan, or any other appliance where temperature sensing is used to control a device.

The coffee maker generally comprises a housing 12, a hot plate or heating plate 14, a removable coffee pot 16, and a user control panel or input 18. The housing 12 forms a water reservoir 20 and coffee basket 22. A water heater 24 located in the housing 12 is connected to an electric cord 26. The water heater 24 is adapted to heat water from the reservoir 20 and deliver the heated water to the coffee basket 22 for drip filter coffee brewing into the coffee pot 16. The hot plate 14 serves as a support for the bottom of the coffee pot 16 and functions as a heater to help keep coffee in the coffee pot warm after brewing.

Figure 2:
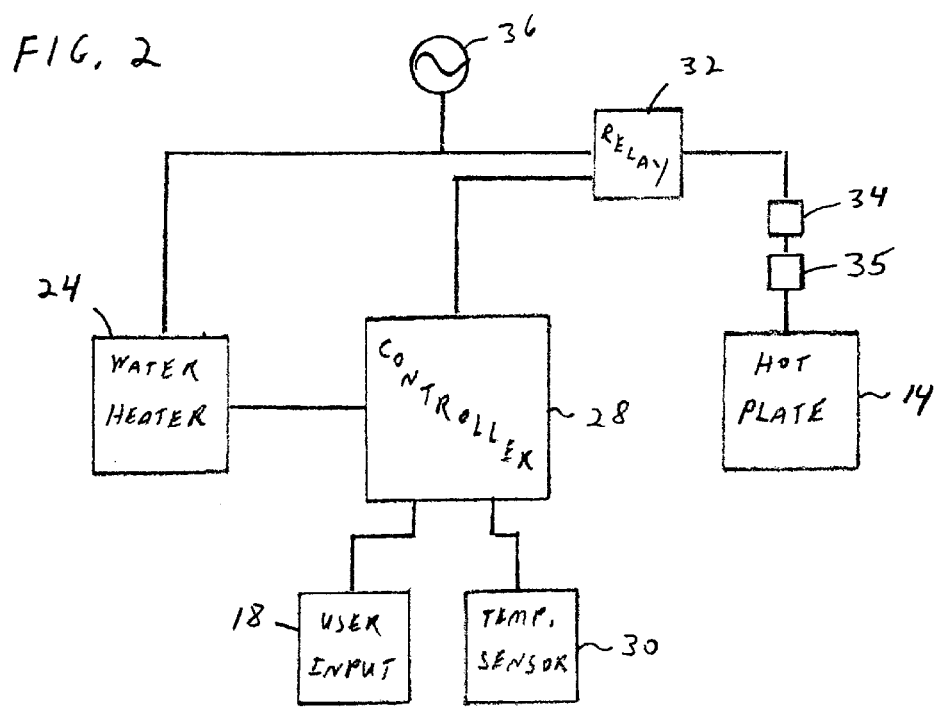
FIG. 2 is a schematic diagram of some of the components of the coffee maker shown in FIG. 1.
Figure 3B:
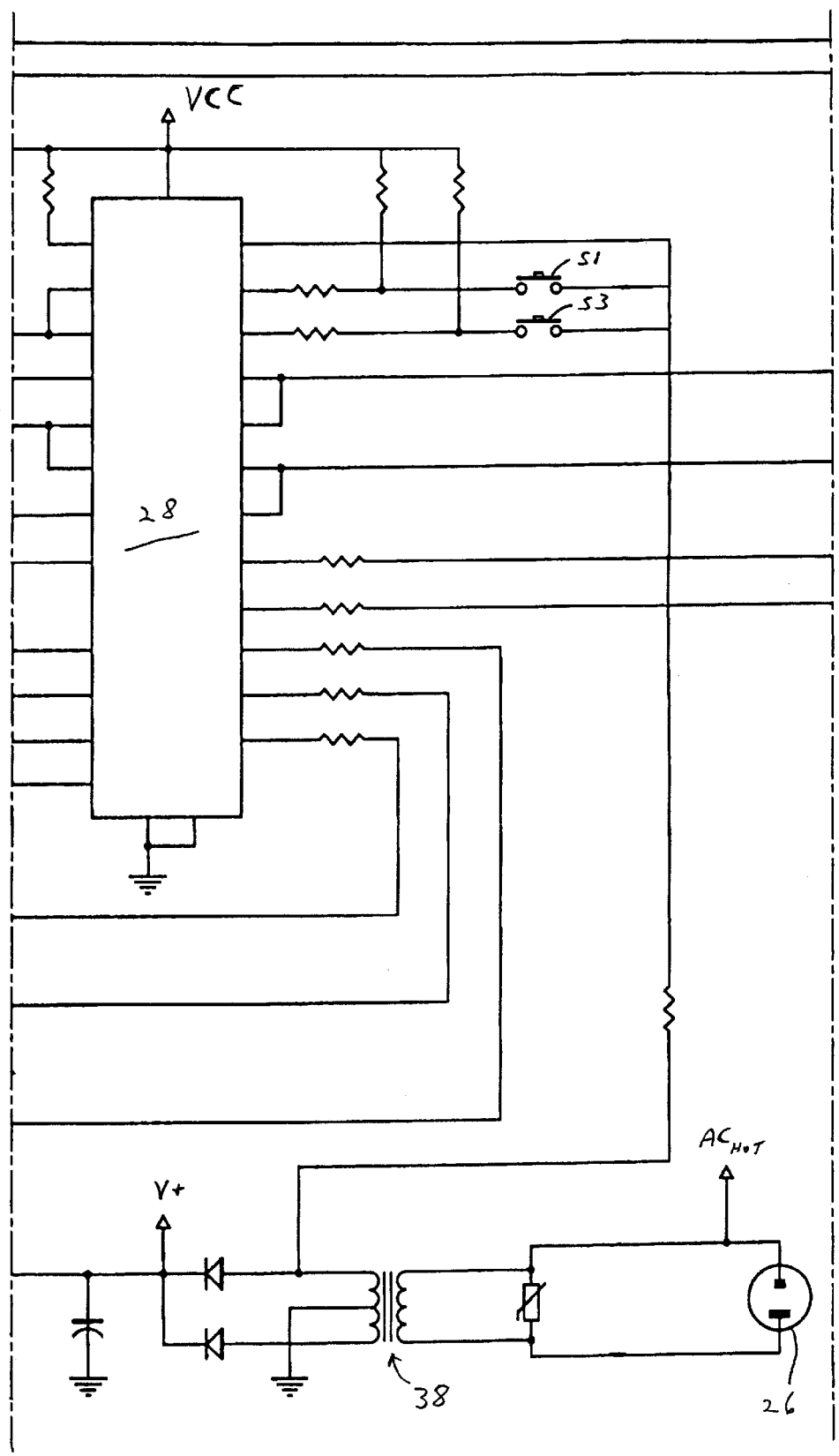
Figure 3C:
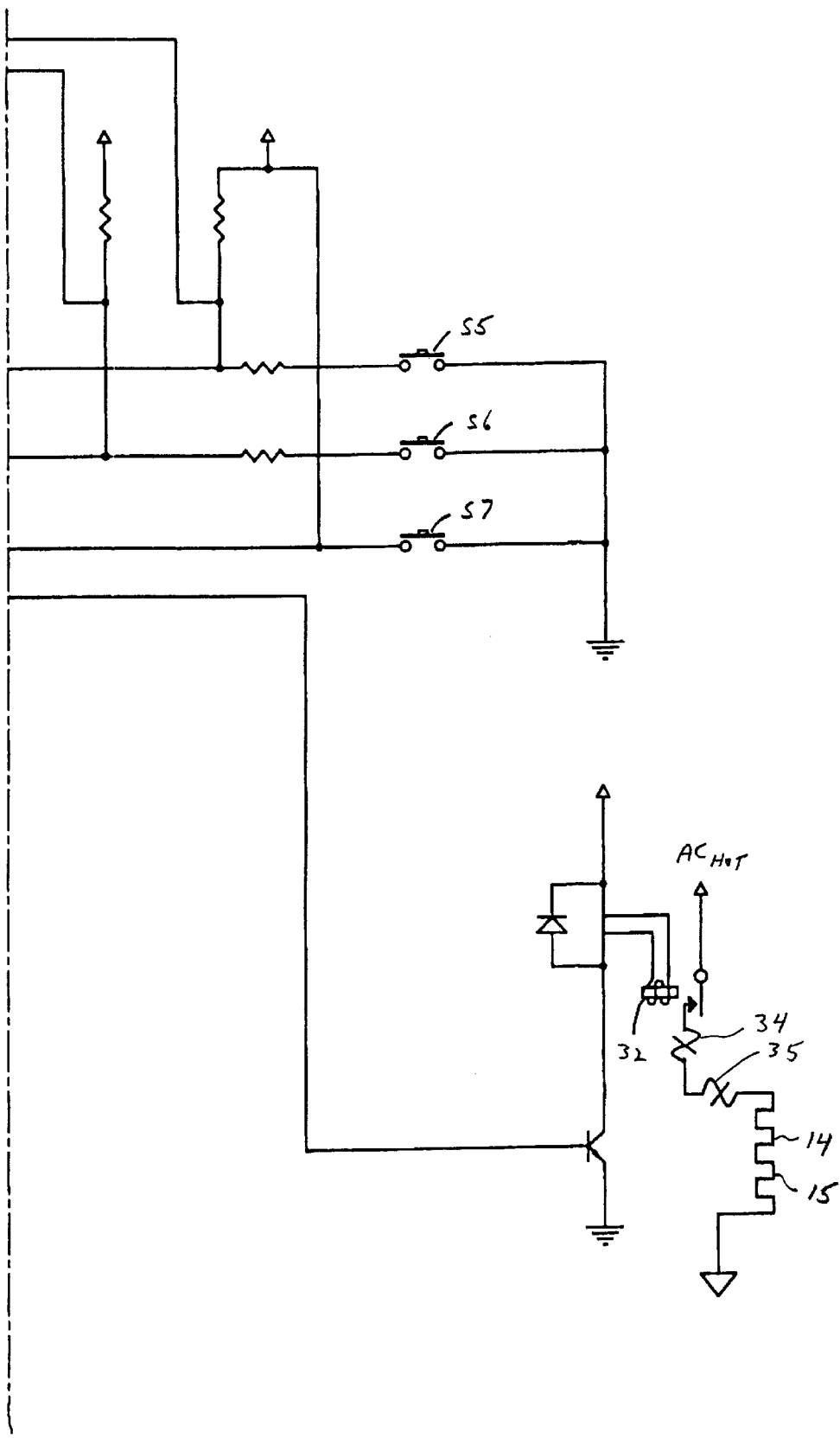

Referring also to FIG. 2, the coffee maker 10 includes a controller 28, a temperature sensor 30, a relay 32, and two thermal cut off (TCO) fuses 34, 35. The plug 26 connects the circuitry to an AC power source 36. The controller 28 is connected to the water heater 24, the user input 18, the temperature sensor 30 and the relay 32. Referring also to FIGS. 3A–3C a more detailed circuit diagram of one type of the circuitry which could be used is shown. In this embodiment the plug 26 has an output $AC_{HOT}$ which is connected to the relay 32, and an AC/DC transformer 38 which produces outputs V+ and VCC. The voltage VCC could be about 5.1 volts, but any suitable voltage could be used. The input 18 includes user actuated switches S1–S7, display 40, and LEDs D1, D2. In alternate embodiments any suitable type of input(s) and display(s) could be provided. In this embodiment S1 is for setting a hot plate temperature setting, S2 is for setting time in hours, S3 is for setting a hot plate heating duration, S4 is for setting time in minutes, S5 is an ON/OFF switch, S6 is an auto-ON switch, and S7 is a program switch. The switches are connected to a control chip which forms the controller 28. The control chip is connected to the relay 32, the display 40, and a piezo buzzer 42 which can be used to signal end of brewing.

The temperature sensor 30 is preferably a thermistor or thermocouple. However, any suitable sensor could be provided. The sensor 30 is connected to the input voltage VCC and has an output connected to the controller 28 as illustrated by line 44. The sensor 30 is suitably located to sense temperature of the hot plate 14. The voltage output from the sensor 30 will vary depending upon the temperature sensed by the sensor. Referring also to FIG. 4, the controller 28 is preferably configured or programmed to disable the coffee maker, until repaired, if the controller discovers two opposite types of sensor problems; namely, a short circuit which results in the sensor 30 being bypassed or open circuit which results in the controller 28 not receiving an input from the sensor 30. In one embodiment, the sensor 30 is connected to the printed circuit board having the controller 28 by lead wires (one of the wires forming part of line 44) The possibility of damage to the lead wires or connections of the lead wires to the sensor 30 or the printed circuit board is present. Damage to the sensor circuit would most likely show itself to the controller as an extreme out-of-range condition. As seen in FIG. 4, an output from the sensor 30 of 0 volts indicates an open circuit or open electrical path between VCC and the controller along line 44. If this occurs, the controller keeps the relay 32 open until the coffee maker is repaired. An output from the sensor 30 of VCC (about 5.1 volts in this embodiment) indicates a short circuit bypassing the sensor 30. Thus, if the controller 28 senses VCC on line 44, the controller keeps the relay 32 open until the coffee maker is repaired. Thus, the present invention provides the feature of sensing an open or a shorted temperature sensor and automatically acting upon the sensed condition.

In the embodiment shown, the user is able to select a temperature range for the hot plate 14 from a plurality of possible preset temperature ranges or settings and also select a hot plate heating duration time. In alternate embodiments the temperature range might not be preset settings, but could be user variable. In an alternate embodiment, the hot plate heating duration time feature also might not be provided. Referring also to FIG. 5, in this embodiment the coffee maker comprise seven user selectable hot plate settings H1–H7. In alternate embodiments, more or less hot plate settings could be provided. Each setting HN has a lower temperature $X_N$ and an upper temperature $Y_N$; where N is the setting number (i.e.: 1–7). Thus, each setting has a temperature range $X_N$–$Y_N$ for the hot plate 14. If the sensor 30 senses that the temperature is less than $X_N$, the controller 28 closes the relay 32 to supply electricity to the hot plate 14 (such as a calrod 15). When the sensor 30 senses a temperature of $Y_N$ or greater, the controller 28 opens the relay 32 to discontinue supply of electricity to the hot plate until the sensor 30 once again senses a temperature less than $X_N$. The set point temperatures $X_N$ and $Y_N$ are set far enough apart so the relay 32 will not have excessive switching and shorten its life. The sensor 30 signals the temperature to the controller 28 by producing an output voltage which varies with the sensed temperature. Thus, the output voltage on line 44 for $X_N$ will be $V_{LN}$ (lower voltage for the setting N) and for $Y_N$ will be $V_{UN}$ (upper voltage for N); where N is the user selected setting HN ($1 \leq N \leq 7$, for the seven preset settings in the described embodiment). The controller 28 is configured or programmed to cycle the hot plate 14 ON and OFF at different temperatures based upon the user selected hot plate temperature range setting; one of H1–H7.

In this embodiment the coffee maker has two TCOs 34, 35 between the relay 32 and calrod 15 of the hot plate 14. In an alternate embodiment more or less than two TCOs could be provided. In a preferred embodiment the two TCOs are adapted to open at two different respective temperatures. However, in alternate embodiments they could be adapted to open at a same temperature. By using two different temperature TCOs, they will not be manufactured from a same batch and, therefore, it is very unlikely they could potentially have a same manufacturing defect. However, in the event of a malfunction of the TCOs or, before the hot plate reaches a temperature which would cause the TCOs to open (causing an opening in the electrical path), the sensor 30 and controller can be used to, at least temporarily, disable or discontinue the supply of electricity to the hot plate until the control of the coffee maker is reset by the user.

The controller 28 is preferably configured or programmed to open the relay 32 and keep the relay open (at least until a user reset procedure is followed) when the sensor 30 senses an out-of-range temperature condition. As seen in FIG. 5, the out-of-range temperature condition comprises the upper temperature $Y_N°$ for the user selected setting plus a predetermined temperature value $Z_N°$ for that setting. In a preferred embodiment the value $Z_N°$ is the same for all the settings H1–H7, such as about 20° to about 30°. However, in alternate embodiments the value $Z_N°$ could be different for one or more of the settings HN. As an example, if $Y_4$ is 120°, if $Y_5$ is 125°, and if Z° for both H4 and H5 is 20°, than the out-of-range temperature condition for H4 would be 140° and the out-of-range temperature condition for H5 would be 145°. The controller 28 would be configured or programmed to recognize an out-of-range voltage from the sensor 30 of the voltage $V_{UN}$ plus the voltage $V_{ZN}$ (voltage difference from temperature value $Z_N°$). When the controller 28 receives the voltage $V_{UN}+V_{ZN}$ on line 44 it opens relay 32 and prevents relay from closing again until a user reset procedure is followed. In an alternate embodiment the controller 28 could control any suitable temporary OFF-until-reset system to discontinue supply of electricity to the hot plate. Alternatively, the system could be permanent OFF-until-repaired disablement. The reset procedure could have any suitable method, such as merely cycling the ON/OFF switch S5. Any suitable reset procedure could be used. This out-of-range temperature condition shut-OFF feature supplements the TCOs and is variable based upon the user selected setting HN. Thus, if $Y_4$ is 70° lower than $Y_3$, the out-of-range temperature does not have to be the same for all settings and the coffee maker can turn OFF sooner for a lower temperature setting than otherwise possible. The present invention can also be used to turn OFF the coffee maker before the TCOs (which are not resettable) open and would then need to be replaced.

The present invention allows for sensing an open or shorted temperature sensor or an out of range temperature condition. The sensing device can be an NTC or PTC thermistor or a thermocouple. The sensor feeds a voltage back to a controller circuit. The controller turns power ON and OFF to the heater. Sensing the out-of-range condition uses true temperature sensing capabilities and then controls the heater when an out of range condition occurs.

Conventional coffee makers with hot plates use two TCOs to prevent over-heating of the hot plate. In addition, bimetal thermostats were used in the past. However, bimetal thermostats only allow upper and lower set point temperature sensing. Therefore, out-of-range sensing was not possible. Thermal cutoffs are non-resettable; once they are opened, the product must be replace. TCOs have been known to short rendering them non-operational although they will still carry current. In the shorted condition they offer no protection if a runaway condition occurs. When using a thermistor as a sensing device to control a relay, true out of range sensor conditions can be read. Then if the out of range condition is detected or an error in the sensing circuit has occurred the coffeemaker can automatically turn OFF.

Sensing an out-of-range condition will provide an added layer of protection to the TCO protection. Also, problems in the sensing circuit can also be detected and the unit can be turned OFF.

Features of the coffee maker 10 include adjustable keeps warm auto time out, adjustable keeps warm temperature. A Piezo buzzer can be used to indicate the end of brew and the end of keeps-warm time, extended temperature set point of brew cycle and extended power interruption memory. There can be seven pushbutton switches on the user interface 18. They are ON/OFF, program, hours, minutes, auto, temperature and hot time. There is a digital clock display. Two LEDs are used to indicate ON/OFF state and auto mode.

The Adjustable keeps-warm auto time out feature is a user selectable feature. The user can select the amount of time the coffeemaker hot water generator/keeps warm hot plate will be on. This time is the total brew and keeps warm time.

The Adjustable keeps-warm auto time feature is a user selectable feature. The user can select the temperature setting the hot plate will remain at after the brew cycle is completed. The coffee brew temperature will not be effected. This feature can utilize a thermistor and a fixed resistor voltage divider and a microcontroller in a closed loop servo control system. Two set points are selected for each setting. The low set point is where the hot water generator (HWG) is cycled ON. The high set point is where the HWG will cycle OFF. The set points are set far enough apart so the relay, which switches the HWG, will not have excessive switch cycles and shorten its life.

Added is a combined opened resistor/thermistor and shorted resistor/thermistor protection. The microcontroller allows the use of sensing of an out-of-range condition. If a thermistor temperature is sensed which is much higher than expected or much lower than expected the HWG will automatically shut OFF and the brew or keeps warm cycle will be terminated. This will help protect against a failure in the temperature sensing circuitry.

The Piezo buzzer end of brew signal/extended temperature set point for brew cycle features are automatic. At the end of the brew cycle the high temperature set point is set higher than the hottest coffee setting this will allow the hot water generator to heat all the water in the reservoir before beginning the keeps-warm cycling. This helps to insure all the water has been heated before the piezo will sound to signal end of brew cycle. The set points will then return to the user-selected set points.

The Piezo buzzer end of brew signal feature comprises the piezo buzzer sounding at the end of the keeps warm time out.

The operation of the coffee maker can comprise, for example, the following:

ON/OFF Button and on/off LED

Pushing the ON/OFF switch will toggle the state of the coffeemaker. In the ON state the LED is lit and in the OFF state the LED is off.

Hour Button

The hour button sets the hour real time and the hours program time.

Minute Button

The minute button sets the minute real time and the minute program time.

Program Button

Once the program button is pressed the coffeemaker will enter the program mode. Program time will be displayed and the auto LED will flash to indicate the coffeemaker is in the program mode. The hour or minute buttons could be pressed to advance the program time. If no button is pushed for seven seconds or the ON/OFF button is pressed or the auto button is pressed. The real time will be displayed, the auto LED will stop flashing and the coffeemaker will leave the program mode. If the ON/OFF button is pressed coffeemaker will also go into the ON mode. If the auto button is pushed the coffeemaker will also enter the auto mode.

Auto Button and Auto LED

After the program time has been set. Pushing the auto switch will toggle the state of the coffeemaker auto mode. In the auto mode the auto LED is lit and when the coffeemaker is not in the auto mode the auto LED is off. When in the auto mode and the coffeemaker advances to the program time the coffeemaker will turn on.

Temperature Button Temperature Display

The temperature button is used to change the keeps warm temperature. There are seven temperature settings ranging from a low H:1 to a warmer H:7. When the button is pressed the display will display H:4, which would be the default setting. Holding the button will increment the temperature setting of the hot plate and the display every second. When temperature H7 is reached the next temperature will roll over to H1. The controls will remember the temperature setting brew to brew with the exception of power interruption. When the Power interruption occurs the coffeemaker will reset and the keeps warm temperature will default to setting H:4. After power up the settings in order would be.

H:4 H:5 H:6 H:7 H:1 H:2 H:3 H:4 . . .

Hot Time Button

The Hot time button is used to change the keeps warm and brew cycle time. After the coffee is brewed the user can use the button to adjust the coffeemaker keeps warm and brew cycle time. There are four temperature settings 1 hour, 2 hours, 3 hours and 4 hours. When the button is pressed the display will display hr:2, which would be the default setting. Holding the button will increment the keeps warm and brew cycle time and the display every second. When time 4:hr is reached the next time will roll over to 1:hr. After power up the settings in order would be.

2:hr 3:hr 4:hr 1:hr 2:hr . . .

Digital Display

The digital display shows real time, auto on time, keeps-warm time out, or keeps-warm temperature.

Piezo Buzzer

The piezo will first buzz at the end of the brew cycle to signal the coffee is ready. The piezo will also buzz at the end of the keeps warm cycle when the coffeemaker automatically shuts off.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A kitchen appliance having a heating element and a control for controlling supply of electricity to the heating element, wherein the control comprises:

a temperature sensor comprising a thermistor or thermocouple;

an electronic controller electrically connected to the temperature sensor; and a user actuatable input connected to the electronic controller for selecting upper and lower temperatures for cycling OFF and ON supply of electricity to the heating element, wherein, for all of the user selectable upper temperatures, the electronic controller is adapted to turn OFF supply of electricity to the heating element when an output from the temperature sensor indicates a sensed temperature which is equal to or above the selected upper temperature plus a first predetermined temperature value.

2. A kitchen appliance as in claim 1 wherein the predetermined temperature value is about the same for all of the user selectable upper temperatures.

3. A kitchen appliance as in claim 2 wherein the predetermined temperature value is about 20° to about 30°.

4. A kitchen appliance as in claim 1 wherein, for all of the user selectable lower temperatures, the electronic controller is adapted to turn OFF supply of electricity to the heating element when an output from the temperature sensor indicates a sensed temperature equal to or less than the selected lower temperature minus a second predetermined temperature value.

5. A kitchen appliance as in claim 1 wherein the kitchen appliance is an electric coffee maker and the heating element comprises a calrod in a coffee pot heating plate.

6. A kitchen appliance as in claim 1 wherein the electronic controller is adapted to interrupt supply of electricity to the heating element upon an output from the temperature sensor to the electronic controller being either about 0 volts to indicate an open electrical circuit between the input voltage and electronic controller or about the magnitude of an input voltage into the temperature sensor to indicate a short circuit bypassing the temperature sensor.

7. A kitchen appliance as in claim 1 wherein the input and the controller are adapted to allow selection of at least four preset upper and lower temperature range settings.

8. A kitchen appliance as in claim 7 wherein the input and controller are adapted to allow selection of at least seven of the settings.

9. A kitchen appliance as in claim 1 wherein the control further comprises at least two thermal cut off fuses in an electrical path between the supply of electricity and the heating element, and wherein each of the fuses are adapted to interrupt flow of electricity therethrough at different temperatures.

10. A kitchen appliance having a heating element and a control for controlling supply of electricity to the heating element, wherein the control comprises:

a temperature sensor adapted to output a sensed temperature signal;

an electronic controller connected to the temperature sensor; and a user actuatable input connected to the electronic controller for selecting a temperature range of the heating element, wherein the electronic controller is adapted to interrupt supply of electricity to the heating element upon an output from the temperature sensor to the electronic controller being either about 0 volts to indicate an open electrical circuit between the input voltage and electronic controller or about the magnitude of an input voltage into the temperature sensor to indicate a short circuit bypassing the temperature sensor.

11. A kitchen appliance as in claim 10 wherein the controller is connected to a switch located in a path between the supply of electricity and the heating element, wherein the controller is adapted to control opening and closing of the switch, and wherein the path further comprises at least one thermal cut off fuse.

12. A kitchen appliance as in claim 11 wherein the at least one thermal cut off fuse comprises two of the fuses adapted to open at different temperatures.

13. A kitchen appliance as in claim 10 wherein for an upper temperature of the user selected temperature range, the controller is adapted to turn OFF supply of electricity to the heating element, until the control is reset by a user, when output from the temperature sensor indicates a sensed temperature equal to or above the user selected upper temperature plus a predetermined temperature value.

14. An electric coffee maker having a water heater, a heating plate for a coffee pot, the heating plate having an electric calrod, and a heating plate control, the heating plate control comprising:

a first thermal cut off fuse adapted to open at a first temperature;

a second thermal cut off fuse adapted to open at a second different temperature, the first and second fuses being connected in series between the calrod and a supply of electricity;

an electronic controller adapted to open and close a path between the supply of electricity and the first fuse; and a temperature sensor connected to the electronic controller, wherein the electronic controller is adapted to open and close the path between the supply of electricity and the first fuse based upon an output from the temperature sensor, and after a predetermined event, the controller is adapted to disable supply of electricity to the calrod when an output signal from the temperature sensor to the controller is about 0 volts to indicate an open electrical circuit between the input voltage and electronic controller, or about equal to the magnitude of an input voltage into the temperature sensor to indicate a short circuit bypassing the temperature sensor.

15. An electric coffee maker as in claim 14 further comprising a user input connected to the controller for selecting a predetermined temperature range of the heating plate from a plurality of predetermined ranges.

16. An electric coffee maker as in claim 15 wherein the controller is adapted to open the path, until the heating plate control is reset by a user, when the temperature sensor senses a temperature which is a predetermined value above an upper temperature of the user selected range.

17. An electric coffee maker as in claim 14 wherein the controller is programmed to cycle open and close the path upon the sensor sensing either an upper temperature or a lower temperature for a heating plate temperature range.

18. An electric coffee maker as in claim 14 wherein the controller is adapted to open the path, until the heating plate control is reset by a user, when the temperature sensor senses a temperature which is a predetermined value above an upper temperature range for the heating plate.

* * * * *